US011446585B2

(12) United States Patent
Cho

(10) Patent No.: US 11,446,585 B2
(45) Date of Patent: Sep. 20, 2022

(54) GROOVED POROUS MEDIA GAS TRAP FOR TERRESTRIAL AND MICROGRAVITY ENVIRONMENT

(71) Applicant: Hamilton Sundstrand Corporation, Charlotte, NC (US)

(72) Inventor: Wei-Lin Cho, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 204 days.

(21) Appl. No.: 16/895,520

(22) Filed: Jun. 8, 2020

(65) Prior Publication Data

US 2021/0379506 A1    Dec. 9, 2021

(51) Int. Cl.
  *B01D 1/00*    (2006.01)
  *B01D 1/06*    (2006.01)
  *B01D 19/00*   (2006.01)

(52) U.S. Cl.
  CPC ............. *B01D 1/0064* (2013.01); *B01D 1/06* (2013.01); *B01D 19/0042* (2013.01); *B01D 2313/105* (2013.01)

(58) Field of Classification Search
  USPC ........... 95/242, 46; 96/4, 6, 9; 261/100, 101, 261/DIG. 19; 55/333
  See application file for complete search history.

(56) References Cited

U.S. PATENT DOCUMENTS

| 3,386,230 A | * | 6/1968 | Riesberg ................ B01D 50/20 55/498 |
| 4,344,777 A |   | 8/1982 | Siposs |
| 4,666,476 A | * | 5/1987 | Reeve ...................... E21B 43/34 96/216 |
| 4,758,337 A |   | 7/1988 | Kohn et al. |
| 4,806,135 A |   | 2/1989 | Siposs |
| 5,474,688 A | * | 12/1995 | Hedrick ............. B01D 21/2416 210/802 |
| 5,618,425 A |   | 4/1997 | Mitamura et al. |
| 6,986,428 B2 |  | 1/2006 | Hester et al. |
| 8,187,756 B2 |  | 5/2012 | Fujita et al. |

(Continued)

FOREIGN PATENT DOCUMENTS

| EP | 0284404 A2 | 9/1988 |
| GB | 247990 A   | 2/1927 |

OTHER PUBLICATIONS

The Extended European Search Report for Application No. 21177939. 2-1101; Report dated Sep. 16, 2021; Report Received: Sep. 24, 2021; 9 pages.

*Primary Examiner* — Nina Bhat
(74) *Attorney, Agent, or Firm* — Cantor Colburn LLP

(57) ABSTRACT

A gas trap assembly including a base connector housing including an inflow port and an outflow port, a reservoir fluidly connecting the inflow port to the outflow port, and a grooved porous media located within the reservoir. The grooved porous media including a plurality of grooves and composed of a material having a plurality of pores of a selected size. The grooved porous media fluidly divides the reservoir into two portions in such a way that a working fluid flowing from the inflow port to the outflow port must flow through the plurality of grooves and the plurality of pores of the grooved porous media. The plurality of grooves and the plurality of pores are configured to prevent gas from passing through the grooved porous media.

13 Claims, 6 Drawing Sheets

(56) References Cited

U.S. PATENT DOCUMENTS

| | | | | |
|---|---|---|---|---|
| 8,696,794 | B2* | 4/2014 | Paragano | B01D 39/12 96/10 |
| 10,330,361 | B2* | 6/2019 | Cho | F25B 43/02 |
| 10,434,454 | B2* | 10/2019 | Lundgren | B01D 46/4227 |
| 10,502,448 | B1* | 12/2019 | Hoffman | B01D 19/0042 |
| 2012/0000278 | A1* | 1/2012 | Phillips | G01N 1/22 73/152.04 |
| 2017/0321936 | A1* | 11/2017 | Cho | F25B 39/00 |
| 2018/0172326 | A1* | 6/2018 | Cho | F28D 15/046 |
| 2019/0232670 | A1 | 8/2019 | Nakajima | |
| 2019/0388805 | A1* | 12/2019 | Cho | B01D 45/16 |

* cited by examiner

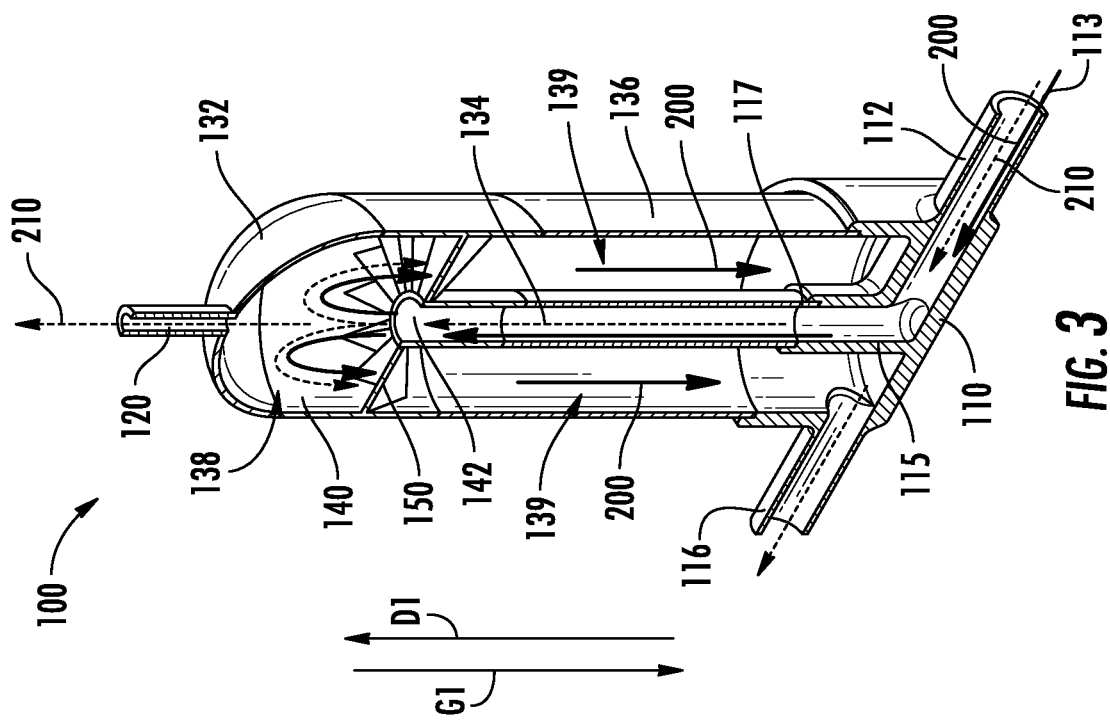
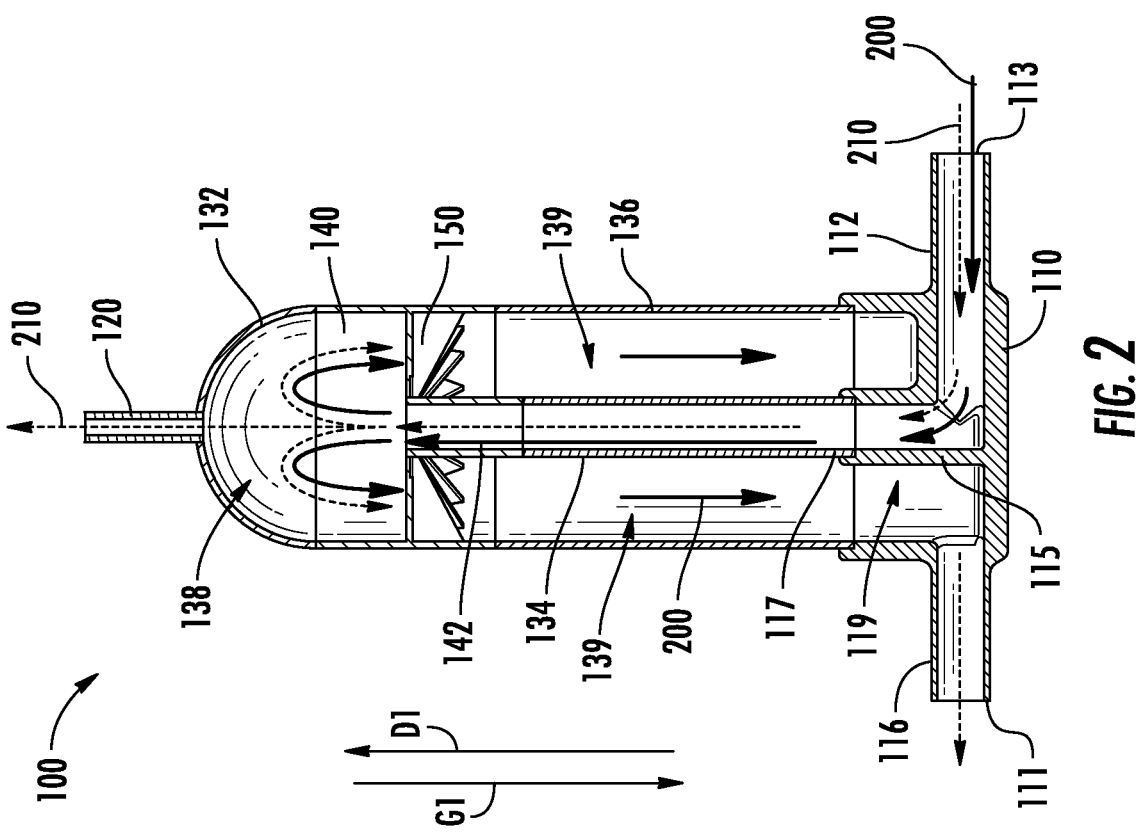

GROOVED POROUS MEDIA GAS TRAP FOR TERRESTRIAL AND MICROGRAVITY ENVIRONMENT

BACKGROUND

The subject matter disclosed herein relates generally to the field of evaporators, and specifically to a gas trap for terrestrial and microgravity environments.

In a single phase flow loop, liquid phase working fluid circulates through a system for different purposes. Due to corrosion, material compatibility and some other reasons, gas might be generated in the system and enter the liquid stream of working fluid. The generated gas can cause damage to the pump or failure to the system if the gas is allowed to flow into the pump suction side.

BRIEF SUMMARY

According to one embodiment, a gas trap assembly is provided. The gas trap assembly includes a base connector housing including an inflow port and an outflow port, a reservoir fluidly connecting the inflow port to the outflow port, and a grooved porous media located within the reservoir. The grooved porous media including a plurality of grooves and composed of a material having a plurality of pores of a selected size. The grooved porous media fluidly divides the reservoir into two portions in such a way that a working fluid flowing from the inflow port to the outflow port must flow through the plurality of grooves and the plurality of pores of the grooved porous media. The plurality of grooves and the plurality of pores are configured to prevent gas from passing through the grooved porous media.

In addition to one or more of the features described above, or as an alternative, further embodiments may include that each of the plurality of grooves are formed by two opposing sidewalls, which form a base and an apex with an apex angle measured between the two opposing sidewalls at the apex and defined such that: the working fluid within each of the plurality of grooves will move from the base to the apex, and the gas within each of the plurality of grooves will move from the apex to the base.

In addition to one or more of the features described above, or as an alternative, further embodiments may include that each of the plurality of grooves are formed by two opposing sidewalls, which form a base and an apex with an apex angle opposite the base.

In addition to one or more of the features described above, or as an alternative, further embodiments may include a central tube circumferentially surrounded by the grooved porous media, wherein the two opposing sidewalls and each of the plurality of grooves extend from a radially inward side of the grooved porous media located proximate the central tube to a radially outward side of the grooved porous media.

In addition to one or more of the features described above, or as an alternative, further embodiments may include that the apex angle at the radially inward side is equivalent to the apex angle at the radially outward side.

In addition to one or more of the features described above, or as an alternative, further embodiments may include that the apex angle remains constant along each of the plurality of grooves from the radially inward side to the radially outward side.

In addition to one or more of the features described above, or as an alternative, further embodiments may include that the apex angle at the radially inward side is greater than the apex angle at the radially outward side.

In addition to one or more of the features described above, or as an alternative, further embodiments may include that the apex angle decreases along each of the plurality of grooves from the radially inward side to the radially outward side.

In addition to one or more of the features described above, or as an alternative, further embodiments may include that the apex angle at the radially inward side is less than the apex angle at the radially outward side.

In addition to one or more of the features described above, or as an alternative, further embodiments may include that the apex angle increases along each of the plurality of grooves from the radially inward side to the radially outward side.

In addition to one or more of the features described above, or as an alternative, further embodiments may include that the apex angle is less than or equal to twice a summation of an angle less than 90° minus a Solid-Liquid Contact Angle of the working fluid.

In addition to one or more of the features described above, or as an alternative, further embodiments may include that the reservoir further incudes a tubular housing, reservoir dome, and a filter housing interposed between the reservoir dome and the tubular housing. The grooved porous media is located within the tubular housing.

In addition to one or more of the features described above, or as an alternative, further embodiments may include that the base connector housing further including a fluid passage fluidly connected to an inlet in the inflow port. The gas trap assembly further includes a transfer tube fluidly connecting the fluid passage to the central tube.

In addition to one or more of the features described above, or as an alternative, further embodiments may include that the central tube is fluidly connected to a gas storage space within the reservoir dome.

In addition to one or more of the features described above, or as an alternative, further embodiments may include that the transfer tube is located within an internal cavity of the transfer housing and separated from the internal cavity, and wherein the internal cavity is separated from the gas storage space by the grooved porous media.

According to another embodiment, a component assembly for a gas trap assembly is provided. The component assembly includes a central tube and a grooved porous media circumferentially surrounding the central tube. The grooved porous media including a plurality of grooves and composed of a material including a plurality of pores of a selected size. The plurality of grooves and the plurality of pores are configured to prevent gas from passing through the grooved porous media.

In addition to one or more of the features described above, or as an alternative, further embodiments may include that each of the plurality of grooves are formed by two opposing sidewalls, which form a base and an apex with an apex angle measured between the two opposing sidewalls at the apex and defined such that: a working fluid within each of the plurality of grooves will move from the base to the apex, and the gas within each of the plurality of grooves will move from the apex to the base.

In addition to one or more of the features described above, or as an alternative, further embodiments may include that each of the plurality of grooves are formed by two opposing sidewalls, which form a base and an apex with an apex angle opposite the base.

In addition to one or more of the features described above, or as an alternative, further embodiments may include that the grooved porous media further includes a radially inward side of the grooved porous media located proximate the central tube and a radially outward side of the grooved porous media. The two opposing sidewalls and each of the plurality of grooves extend from the radially inward side to the radially outward side.

In addition to one or more of the features described above, or as an alternative, further embodiments may include that the apex angle at the radially inward side is equivalent to the apex angle at the radially outward side.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 2 is a cutaway view of the gas trap assembly of FIG. 1, in accordance with an embodiment of the present disclosure;

FIG. 3 is a cutaway isometric view of the gas trap assembly of FIG. 1, in accordance with an embodiment of the present disclosure;

DETAILED DESCRIPTION

A detailed description of one or more embodiments of the disclosed apparatus and method are presented herein by way of exemplification and not limitation with reference to the Figures.

In a single phase flow loop, liquid phase working fluid circulates through a system for different purposes. Due to corrosion, material compatibility and various other reasons, gas might be generated in the system and enter the liquid stream of working fluid. The generated gas can cause damage to the pump or failure to the system if the gas is allowed to flow into the pump suction side.

In a gravity field, gas bubbles flowing with the liquid stream can coalesce in the high point of the flow loop due to buoyancy. The locations of gas bubble accumulation can be identified with reasonable accuracy. However, in the microgravity field, the bubbles can flow with the liquid stream and be anywhere. Embodiments disclosed herein seek to separate the gas from the liquid stream and trap the gas in a known location in both terrestrial and microgravity fields.

Figure 1:
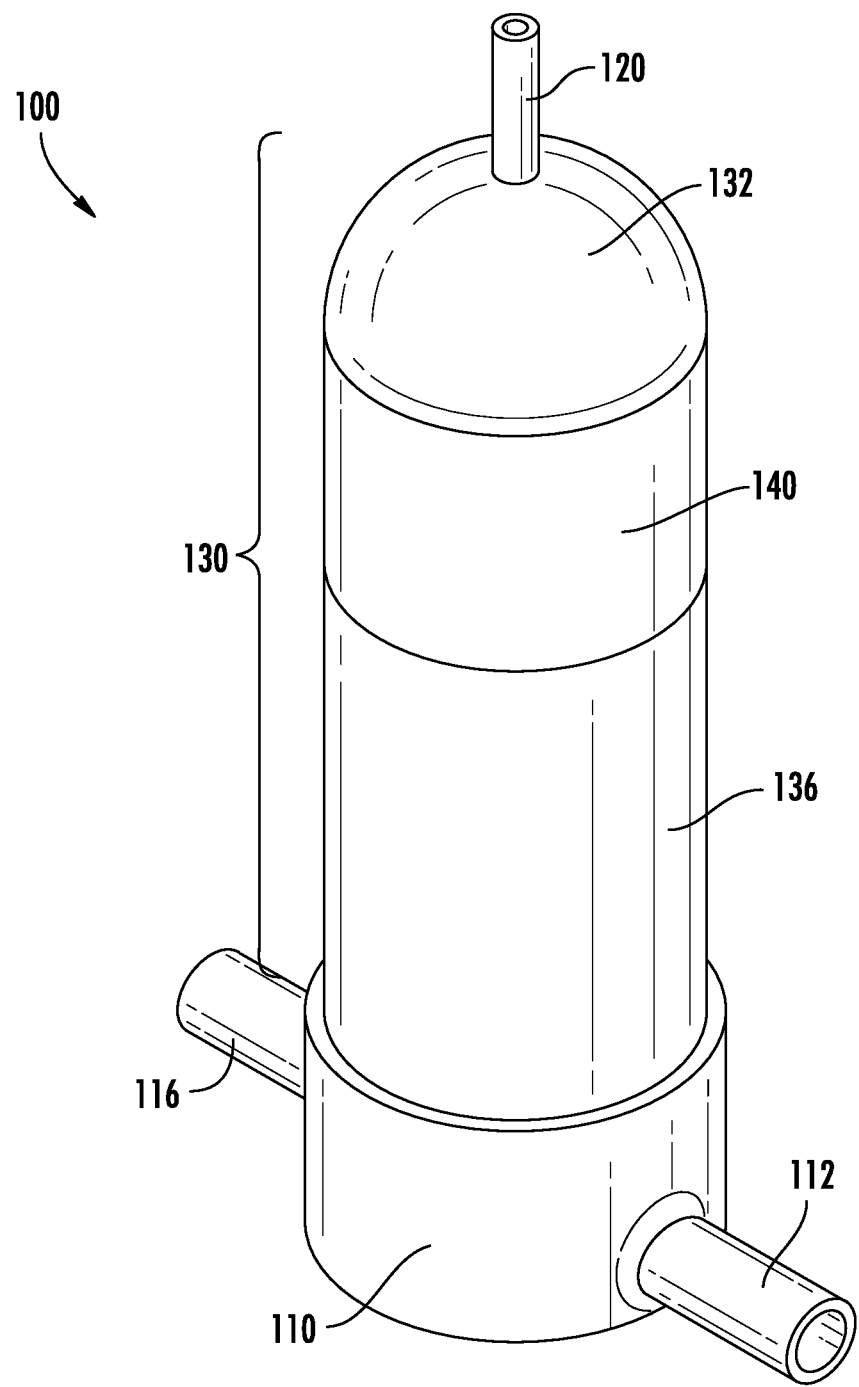
FIG. 1 is an isometric view of a gas trap assembly, in accordance with an embodiment of the present disclosure.

Referring now to FIG. 1, an isometric view of a gas trap assembly 100 is illustrated, according to an embodiment of the present disclosure. The gas trap assembly 100 includes a base connector housing 110, a reservoir 130, and a venting and sampling port 120. The base connector housing 110 includes an inflow port 112 and an outflow port 116. The outflow port 116 may be located opposite the inflow port 112. The reservoir 130 fluidly connects the inflow port 112 to the outflow port 116. The reservoir 130 is interposed between the inflow port 112 and the outflow port 116, such that a working fluid 200 flows from the inflow port 112 to the outflow port 116 through the reservoir 130. The reservoir 130 is composed of a tubular housing 136, a reservoir dome 132, and a filter housing 140. The filter housing 140 is interposed between the reservoir dome 132 and the tubular housing 136, as illustrated in FIG. 1. The venting and sampling port 120 is attached to the reservoir dome 132. The tubular housing 136 is attached to the base connector housing 110. The filter housing 140 is attached to the tubular housing 136 and the reservoir dome 132 is attached to the filter housing 140.

Referring now to FIGS. 2 and 3, with continued reference to FIG. 1, a cross-sectional view of the gas trap assembly 100 is illustrated, according to an embodiment of the present disclosure. The base connector housing 110 includes an inlet 113 located within the inflow port 112 to allow a working fluid 200 to enter the gas trap assembly 100. The working fluid 200 may be accompanied by gas 210 in the form of gas bubbles. The inlet 113 is fluidly connected to a fluid passage 115 located within the base connector housing 110. The fluid passage 115 to may make include a right angle turn to fluidly connect the inlet 113 to a transfer tubes, which are located at 90° relative to each other, as illustrated in FIGS. 2 and 3. The fluid passage 115 is fluidly connected to the transfer tube 134 located within the tubular housing 136. The transfer tube 134 is attached to the fluid passage 115 to form a sealed connection 117. The working fluid 200 flows from the fluid passage 115, within the base connector housing 110 to the transfer tube 134 within the tubular housing 136. The transfer tube 134 is fluidly connected to a central tube 142. The working fluid 200 flows from the transfer tube 134 to the central tube 142 and then into gas storage space 138 within the reservoir dome 132. The working fluid 200 and gas 210 is forced to flow in a reverse direction and flow through the grooved porous media 150. In other words, the working fluid 200 and the gas 210 are forced to make a 180° turn when leaving the central tube 142 in order to get to the grooved porous media 150.

At this stage, the gas 210 is separated from the working fluid 200 by the grooved porous media 150. Gas 210 is prevented from passing through the grooved porous media 150 and will be stored in the gas storage space 138 for occasional venting out of the venting and sampling port 120. The venting and sampling port 120 may be normally closed during operation but can be opened for liquid sampling of the working fluid 200 or venting of the gas 210.

The grooved porous media 150 is configured to separate the gas 210 from the working fluid 200 by creating a physical separation between the inflow and outflow liquid streams, as discussed further herein.

In terrestrial field (e.g., gravity field) bubbles of the gas 210 will move toward a direction D1 opposite of a gravity field direction G1 due to a buoyancy effect. The gravity field direction G1 is pointing toward the base in FIGS. 2 and 3, the blocked gas 210 in the gas storage space 138 will move away from the grooved porous media 150 toward the venting and sampling port 120, which can be vented out whenever necessary.

In a microgravity environment, the distribution of bubbles of the gas 210 is random. It is possible that the bubbles of gas 210 are being pushed against the grooved porous media 150 surface by the liquid flow momentum. To avoid any bubbles of gas 210 accumulating on a surface of the grooved porous media 150 adjacent to the gas storage space 138, the bubbles of the gas 210 are expelled away from the grooved porous media 150 as discussed with reference to FIG. 7 herein.

The working fluid 200 will migrate through the grooved porous media 150 into an internal cavity 139 within the tubular housing 136. As illustrated in FIGS. 2 and 3, the transfer tube 134 is located within the internal cavity 139 but is separated from the internal cavity 139. The only fluid path between the internal cavity and the tube 134 is through the grooved porous media 150. The transfer tube 134 passes through a center of the internal cavity 139. The internal cavity 139 is separated from the gas storage space 138 of the reservoir dome 132 by the grooved porous media 150

The internal cavity 139 of the tubular housing 136 is fluidly connected to an internal cavity 119 of the base connector housing 110. The working fluid 200 flows from the internal cavity 139 of the tubular housing 136 to the internal cavity 119 of the base connector housing 110. The internal cavity 119 of the base connector housing 110 is fluidly connected to the outlet 111 of the base connector housing 110 located in the outflow port 116. The working fluid 200 flows from the internal cavity 119 of the base connector housing 110 out of the outlet 111 and exits the gas trap assembly 100.

Figure 4:
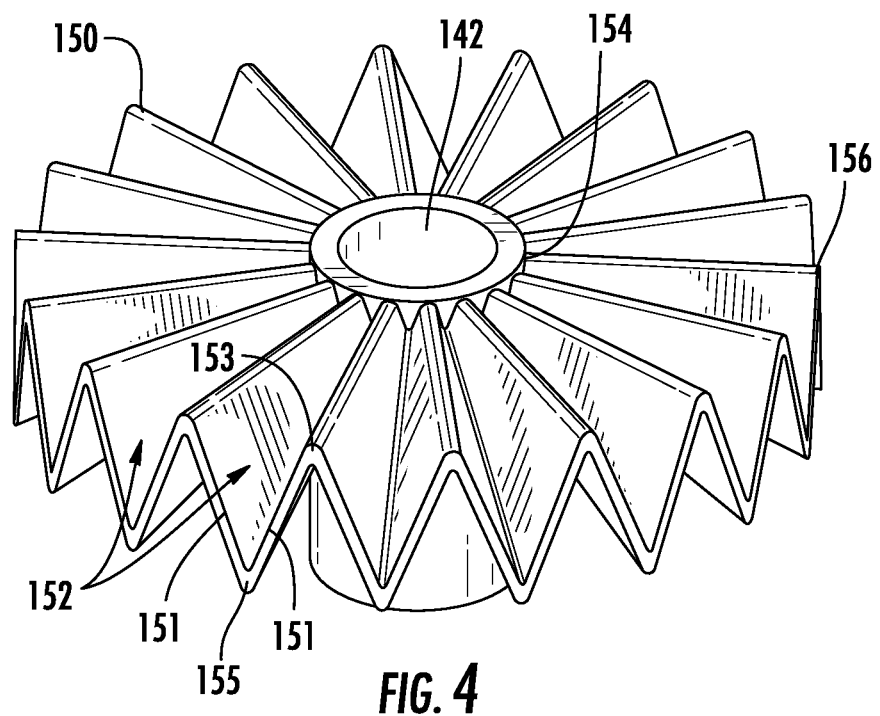
FIG. 4 is an isometric view of a grooved porous media for use in the gas trap assembly of FIG. 1, in accordance with an embodiment of the present disclosure.
Figure 5:
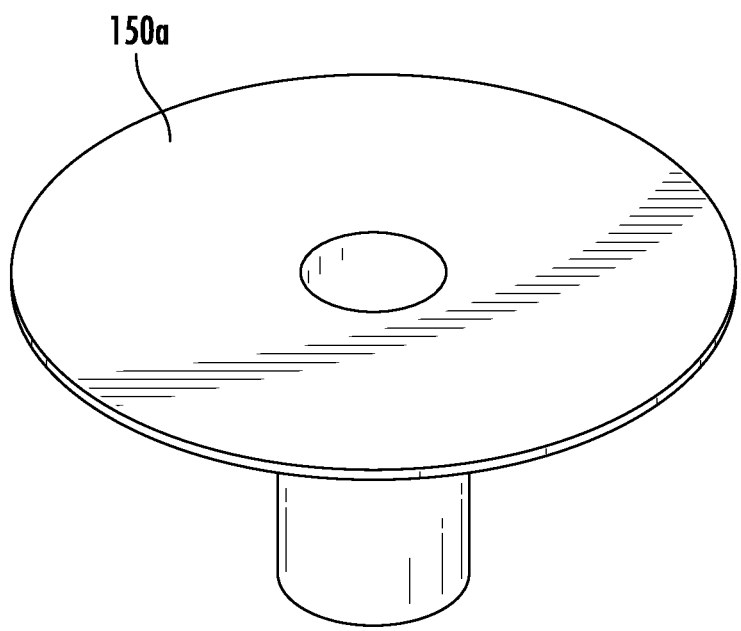
FIG. 5 is an isometric view of a non-grooved porous media that was previously used in prior designs of the gas trap assembly of FIG. 1.

Referring now to FIGS. 4 and 5, with continued reference to FIGS. 1-3, an isometric view of the grooved porous media 150 is illustrated in FIG. 4 according to an embodiment of the present disclosure and an isometric view of anon-grooved porous media 150a used in prior designs of the gas trap assembly is illustrated. As illustrated in FIG. 5, the non-grooved porous media 150a is flat and thus does not offer the same advantages as the grooved porous media 150, as discussed herein.

The grooved porous media 150 circumferentially surrounds the central tube 142. The grooved porous media 150 and the central tube 142 may form a component assembly for the gas trap assembly 100. The grooved porous media 150 is circular in shape and includes a radially inward side 154 located proximate the central tube 142 and a radially outward side 156. The grooved porous media 150 extends from the radially inward side 154 located proximate the central tube 142 to the radially outward side 156. The grooved porous media 150 includes a plurality of grooves 152. The grooved porous media 150 is composed of a material with a plurality of pores to allow particles through of a selected size. The grooved porous media 150 may be composed of metallic sintered powders, multilayer screen mesh, felt, or any other similar material known to one of skill in the art. The pores have a pore size. The pore size can range from a few micrometers to few hundreds micrometers. The grooved porous media 150 fluidly divides the reservoir 130 into two portions (e.g., before the grooved porous media 150 and after the grooved porous media 150) in such a way that working fluid 200 flowing from the inflow port 112 to the outflow port 116 must flow through the plurality of grooves 152 and plurality of pores of the grooved porous media 150.

Each of the grooves 152 has a same shape as the others and is immediately adjacent to neighboring grooves 152. In addition, each of the grooves 152 is formed by two opposing sidewalls 151, such as, for example, a first opposing sidewall 151 and a second opposing sidewall 151. The two opposing sidewalls 151 are tapered toward each other to form a base 153 and an apex 155. Advantageously, the grooves 152 provide increased surface area for the grooved porous media 150 to filter working fluid 200 faster than the non-grooved porous media 150a would be able to. Also advantageously, the grooved porous media 150 allows the working fluid 200 to flow through the grooved porous media 150 with a lower pressure drop.

When the gas-rich liquid (e.g., working fluid 200 and gas 210) flows into the grooved porous media 150, only the bubbles of the gas 210 that are smaller than the pore size of the grooved porous media 150 will be able to flow through. Any bubbles of the gas 210 that are larger than the pore size will be blocked and stored in the gas storage space 138. Controlling the pore size of the grooved porous media 150 controls the size of the bubble of the gas 210 to flow into a suction pump that is fluidly connected to the outlet 111 of the outflow port 116. To prevent any bubbles of gas 210 from leaking around the grooved porous media 150, the interface between the grooved porous media 150 and interior walls of the filter housing 140 and the interface between the grooved porous media 150 and the central tube 142 are fabricated such that the largest allowable gap is smaller than the pore size of the grooved porous media 150.

Figure 6:
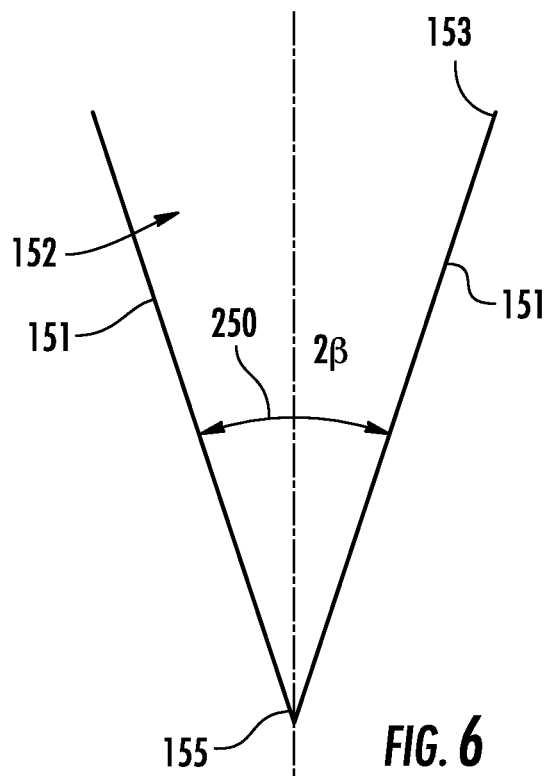
FIG. 6 is a schematic view of dimensions of the grooved porous media of FIG. 4, in accordance with an embodiment of the present disclosure.
Figure 7:
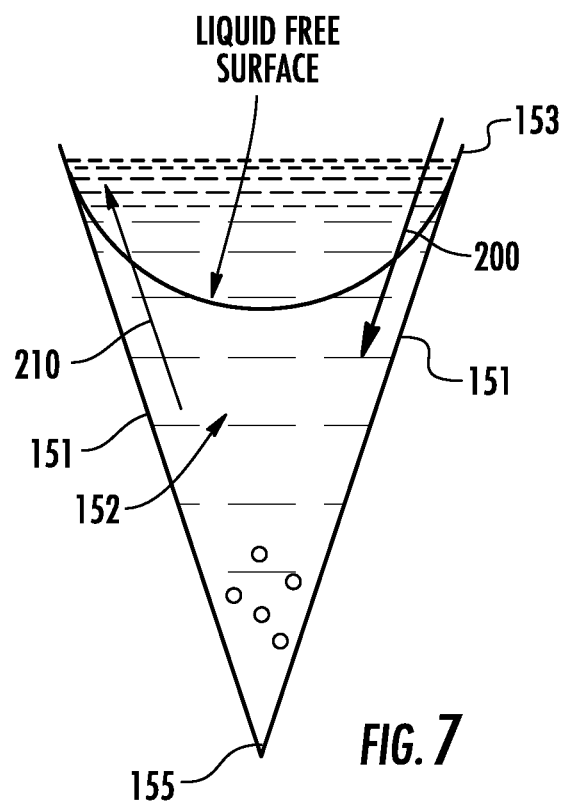
FIG. 7 is a schematic view of liquid and gas movement within the groove of the grooved porous media of FIG. 4, in accordance with an embodiment of the present disclosure.

Referring now to FIGS. 6 and 7, with continued reference to FIGS. 1-5, a schematic view of the groove 152 is illustrated, according to an embodiment of the present disclosure. In a microgravity environment the working fluid 200 will move from the base 153 in a direction of the apex 155 and the gas 210 will be pushed from the apex 155 to a direction of the base 153 by the working fluid replenishing into groove 152 toward the apex 155 if half of an apex angle 250 is smaller than the difference between a right angle (i.e., 90°) and a solid-liquid contact angle. The solid liquid contact angle may vary from liquid-to-liquid and thus depends upon a type of working fluid 200 utilized. The embodiments disclosed may be applicable for any solid-liquid pair as long as the liquid can "wet" the solid material or in other words the solid-liquid contact angel is smaller than 90°.

The apex 155 has an apex angle 250 as measured between two opposing side walls 151. In an embodiment, the apex angle 250 is equal to a selected angle of $2\beta$ where $\beta$ is less than 90° minus a solid-liquid contact angle. In other words the selected angle of $2\beta$ is equal to $2\times((\beta<90)$—Solid-Liquid Contact Angle). In other words the selected angle $2\beta$ is less than or equal to twice the summation of an angle less than 90° minus a Solid-Liquid Contact Angle of the working fluid 200. That is, the apex angle 250 is defined such that, for a fluid flow of working fluid 200 and gas 210 moving through one of the channels 140 in a microgravity environment where a portion of the fluid flow is in a liquid phase (e.g., working fluid 200) and another portion of the fluid flow is in a vapor phase (e.g., gas), the portion of the fluid flow in the liquid phase (e.g., working fluid 200) within a particular groove 152 will move in the particular groove 152 from the base 153 to the apex 155 and the portion of the fluid flow in the vapor phase (e.g., gas) within the particular groove 152 will move in the particular groove 152 from the apex 155 to the base 153.

Figure 8:
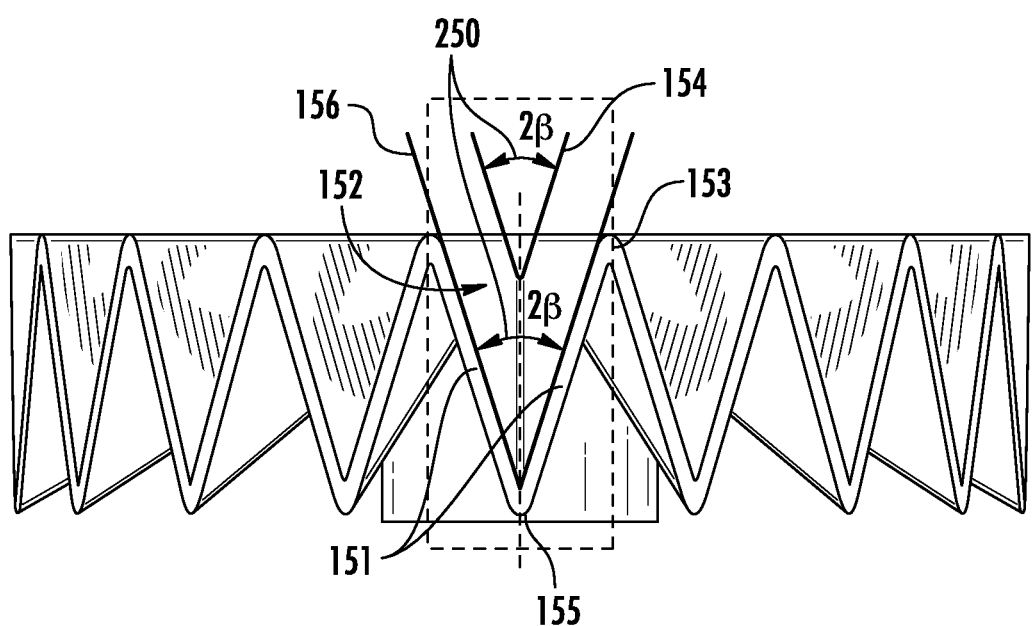
FIG. 8 is a view of a groove having a constant apex angle, in accordance with an embodiment of the present disclosure.
Figure 9:
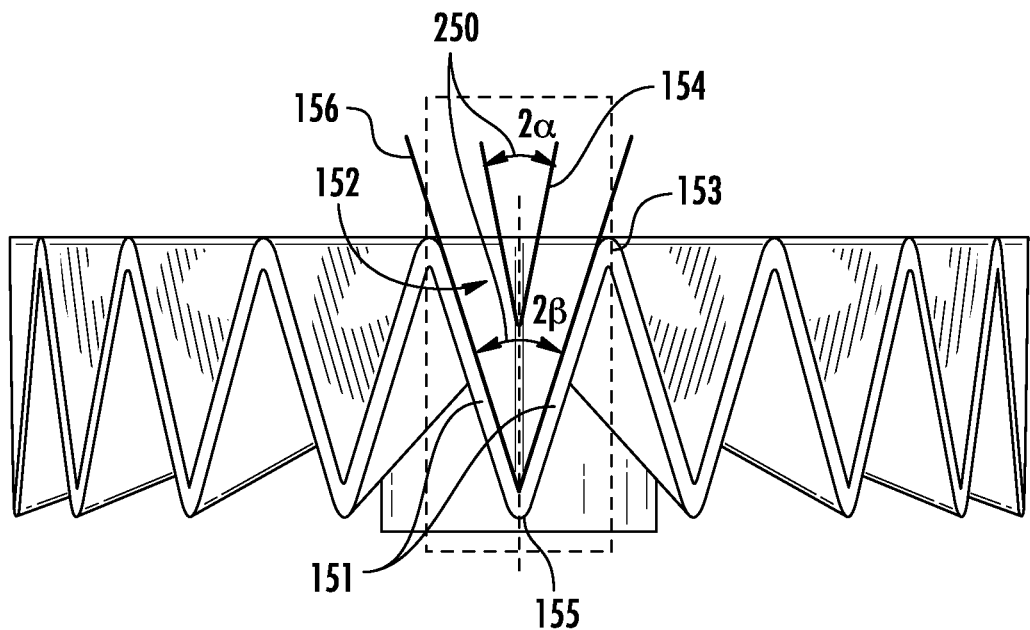
FIG. 9 is a view of a groove having an apex angle that increases radially outward, in accordance with an embodiment of the present disclosure.
Figure 10:
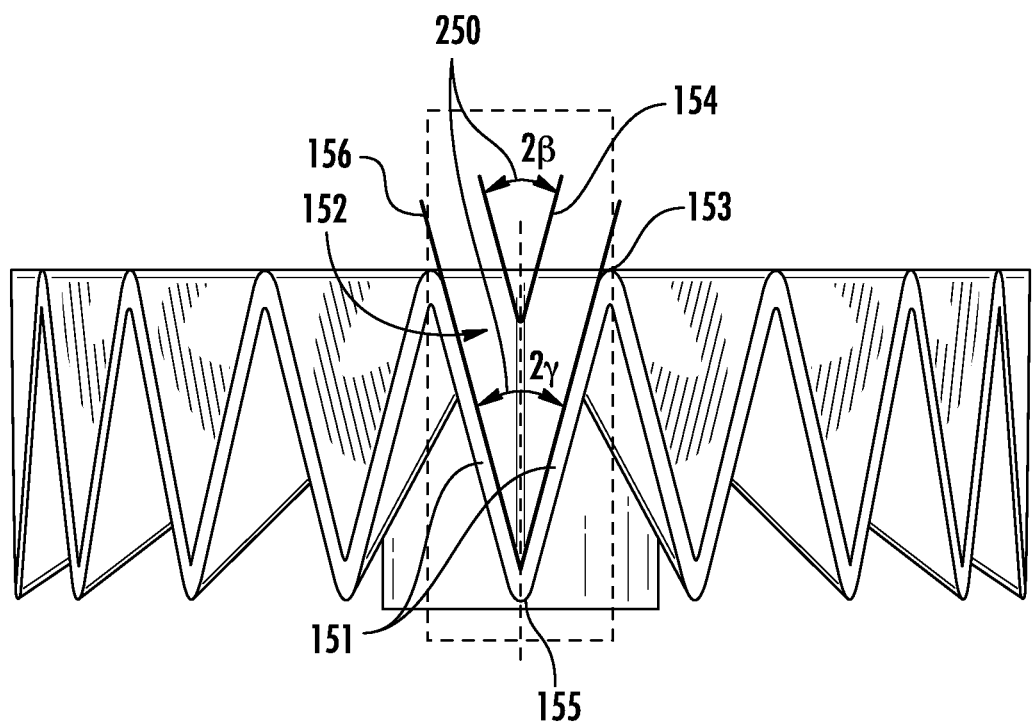
FIG. 10 is a view of a groove having an apex angle that decreases radially outward, in accordance with an embodiment of the present disclosure.

Referring now to FIGS. 8, 9, and 10, with continued reference to FIGS. 1-7, apex angles 250 of the grooved porous media 150 are illustrated, in accordance with an embodiment of the present disclosure.

The apex angle 250 is measured between the two opposing sidewalls 151 at the apex 155. The opposing sidewalls 151 and each of the plurality of grooves 152 extend from the radially inward side 154 radially outward to the radially outward side 156.

In one embodiment, the apex angle 250 at the radially inward side 154 may be equivalent to the apex angle 250 at the radially outward side 156, as illustrated in FIG. 8. In FIG. 8 the apex angle 250 at the radially inward side 154 is equivalent to 2β and the apex angle 250 at the radially outward side 156 is equivalent to 2β. In FIG. 8 the apex angle 250 remains constant or unchanged along the groove 152 from the radially inward side 154 the radially outward side 156.

In one embodiment, the apex angle 250 at the radially inward side 154 may be unequal to the apex angle 250 at the radially outward side 156, as illustrated in FIGS. 9 and 10. The apex angle 250 may vary in size along the groove 152 from the radially inward side 154 the radially outward side 156.

In one embodiment, the apex angle 250 at the radially inward side 154 may be less than the apex angle 250 at the radially outward side 156, as illustrated in FIG. 9. In FIG. 9 the apex angle 250 at the radially inward side 154 is equivalent to 2α and the apex angle 250 at the radially outward side 156 is equivalent to 2β. In FIG. 9 the apex angle 250 increases in size along the groove 152 from the radially inward side 154 the radially outward side 156.

In one embodiment, the apex angle 250 at the radially inward side 154 may be greater than the apex angle 250 at the radially outward side 156, as illustrated in FIG. 10. In FIG. 10 the apex angle 250 at the radially inward side 154 is equivalent to 2β and the apex angle 250 at the radially outward side 156 is equivalent to 2γ. In FIG. 10 the apex angle 250 decreases in size along the groove 152 from the radially inward side 154 the radially outward side 156.

Technical effects and benefits of the features described herein include utilizing a grooved porous media to filter gas bubbles from a working fluid in both microgravity environments and terrestrial environments.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas trap assembly, comprising:
   a base connector housing comprising an inflow port and an outflow port;
   a reservoir fluidly connecting the inflow port to the outflow port, wherein the reservoir is coupled to a venting and sampling port; and
   a grooved porous media located within the reservoir, the grooved porous media comprising a plurality of grooves and composed of a material having a plurality of pores of a selected size,
   wherein the plurality of pores are sized to prevent gas entering the inflow port from reaching the outflow port such that the gas is vented via the venting and sampling port and to pass a working fluid entering the inflow port such that the working fluid reaches the outflow port.

2. The gas trap assembly of claim 1, wherein each of the plurality of grooves is formed by two opposing sidewalls that extend radially outward from the central tube, are separated at one end of each of the two opposing sidewalls to form a base that extends radially outward from the central tube at the one end of the two opposing sidewalls, and are joined at another end, opposite the one end, to form an apex that extends radially outward from the central tube at the other end of the two opposing sidewalls, and the plurality of grooves are formed such that:
   the working fluid within each of the plurality of grooves moves from the base to the apex, and
   the gas within each of the plurality of grooves moves from the apex to the base.

3. The gas trap assembly of claim 1, wherein each of the plurality of grooves are formed by two opposing sidewalls that extend radially outward from the central tube, are separated at one end of each of the two opposing sidewalls to form a base that extends radially outward from the central tube at the one end of the two opposing sidewalls, and are joined at another end, opposite the one end, to form an apex that extends radially outward from the central tube at the other end of the two opposing sidewalls.

4. The gas trap assembly of claim 3, wherein an apex angle measured between the two opposing sidewalls at the apex directly adjacent to the central tube and a second apex angle measured between the two opposing sidewalls at the apex radially outward from the central tube are a same angle.

5. The gas trap assembly of claim 3, wherein an apex angle measured between the two opposing sidewalls at the apex directly adjacent to the central tube is greater than a second apex angle measured between the two opposing sidewalls at the apex radially outward from the central tube.

6. The gas trap assembly of claim 3, wherein an apex angle measured between the two opposing sidewalls at the apex directly adjacent to the central tube is smaller than a second apex angle measured between the two opposing sidewalls at the apex radially outward from the central tube.

7. The gas trap assembly of claim 3, wherein an apex angle measured between the two opposing sidewalls is based on a Solid-Liquid Contact Angle of the working fluid.

8. The gas trap assembly of claim 3, wherein the reservoir further comprises:

a tubular housing;

reservoir dome; and a filter housing interposed between the reservoir dome and the tubular housing, wherein the grooved porous media is located within the tubular housing.

9. The gas trap assembly of claim 8, wherein the base connector housing further comprising a fluid passage fluidly connected to an inlet in the inflow port, and wherein the gas trap assembly further comprises a transfer tube fluidly connecting the fluid passage to the central tube.

10. The gas trap assembly of claim 9, wherein the central tube is fluidly connected to a gas storage space within the reservoir dome.

11. The gas trap assembly of claim 10, wherein the transfer tube is located within an internal cavity of the transfer housing and separated from the internal cavity, and wherein the internal cavity is separated from the gas storage space by the grooved porous media.

12. A component assembly for a gas trap assembly, comprising:

a central tube;

a grooved porous media circumferentially surrounding the central tube, the grooved porous media comprising a plurality of grooves and composed of a material comprising a plurality of pores of a selected size, wherein the plurality of pores are sized to prevent gas from passing through the grooved porous media, each of the plurality of grooves is formed by two opposing sidewalls that extend radially outward from the central tube, are separated at one end of each of the two opposing sidewalls to form a base that extends radially outward from the central tube at the one end of the two opposing sidewalls, and are joined at another end, opposite the one end, to form an apex that extends radially outward from the central tube at the other end of the two opposing sidewalls, and an apex angle measured between the two opposing sidewalls at the apex directly adjacent to the central tube and a second apex angle measured between the two opposing sidewalls at the apex radially outward from the central tube are a same angle or a different angle.

13. The component assembly of claim 12, wherein the plurality of grooves is formed such that a working fluid within each of the plurality of grooves moves from the base to the apex, and the gas within each of the plurality of grooves moves from the apex to the base.

* * * * *